United States Patent
Ilda

(10) Patent No.: US 7,071,650 B2
(45) Date of Patent: Jul. 4, 2006

(54) SYNCHRONOUS INDUCTION MOTOR AND ELECTRIC HERMETIC COMPRESSOR USING THE SAME

(75) Inventor: Keizo Ilda, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/519,938

(22) PCT Filed: Apr. 19, 2004

(86) PCT No.: PCT/JP2004/005541

§ 371 (c)(1),
(2), (4) Date: Dec. 29, 2004

(87) PCT Pub. No.: WO05/006520

PCT Pub. Date: Jan. 20, 2003

(65) Prior Publication Data

US 2005/0231151 A1    Oct. 20, 2005

(30) Foreign Application Priority Data

Jul. 9, 2003  (JP) ............................ 2003-194218
Oct. 14, 2003 (JP) ............................ 2003-353461

(51) Int. Cl.
*H02P 1/44*    (2006.01)
*H02P 25/04*   (2006.01)
*F04B 39/00*   (2006.01)

(52) U.S. Cl. ..................... 318/785; 318/781; 318/786; 327/365

(58) Field of Classification Search ............... 318/785, 318/786, 788, 789–792, 794, 795, 781; 327/365
See application file for complete search history.

(56) References Cited

U.S. PATENT DOCUMENTS

| | | | |
|---|---|---|---|
| 3,564,273 A | | 2/1971 | Cockrell ..................... 318/696 |
| 3,671,830 A | * | 6/1972 | Kruper ....................... 318/786 |
| 3,970,908 A | * | 7/1976 | Hansen et al. .............. 318/786 |
| 4,600,873 A | * | 7/1986 | Roesel et al. ............... 318/701 |
| 4,605,888 A | * | 8/1986 | Kim .......................... 318/786 |
| 4,628,443 A | | 12/1986 | Rickard et al. ............. 364/184 |
| 4,764,714 A | * | 8/1988 | Alley et al. ................. 318/786 |
| 5,276,392 A | * | 1/1994 | Beckerman ................. 318/751 |
| 5,561,357 A | * | 10/1996 | Schroeder ................... 318/789 |
| 5,617,001 A | * | 4/1997 | Nacewicz et al. .......... 318/788 |

(Continued)

FOREIGN PATENT DOCUMENTS

EP    1 227 568    7/2002

(Continued)

*Primary Examiner*—Rita Leykin
(74) *Attorney, Agent, or Firm*—Wenderoth, Lind & Ponack, L.L.P.

(57) ABSTRACT

A synchronous induction motor has a stator having a main winding and an auxiliary winding; a rotor having a yoke, a permanent magnet embedded in the yoke and a secondary conductor provided in the vicinity of periphery of the yoke; and a starter. The starter has a starting capacitor connected in series with the auxiliary winding of the synchronous induction motor, and a switching unit to open/close a circuit from the starting capacitor to the auxiliary winding. The switching unit closes the circuit from the starting capacitor to the auxiliary winding when the synchronous induction motor is at rest, and opens the circuit after the synchronous induction motor is started. The synchronous induction motor is highly efficient and easy to re-start with low power consumption. The electric hermetic compressor equipped with the synchronous induction motor can perform with the similar effects.

26 Claims, 7 Drawing Sheets

U.S. PATENT DOCUMENTS

| | | | |
|---|---|---|---|
| 6,346,790 B1* | 2/2002 | Kemp et al. | 318/813 |
| 6,847,183 B1* | 1/2005 | Marioni | 318/700 |
| 6,864,659 B1* | 3/2005 | Ratz et al. | 318/772 |
| 2002/0140309 A1* | 10/2002 | Yanashima et al. | 310/162 |

FOREIGN PATENT DOCUMENTS

| | | |
|---|---|---|
| EP | 1 246 348 | 10/2002 |
| JP | 2002-300763 | 10/2002 |

* cited by examiner

FIG. 11 – PRIOR ART
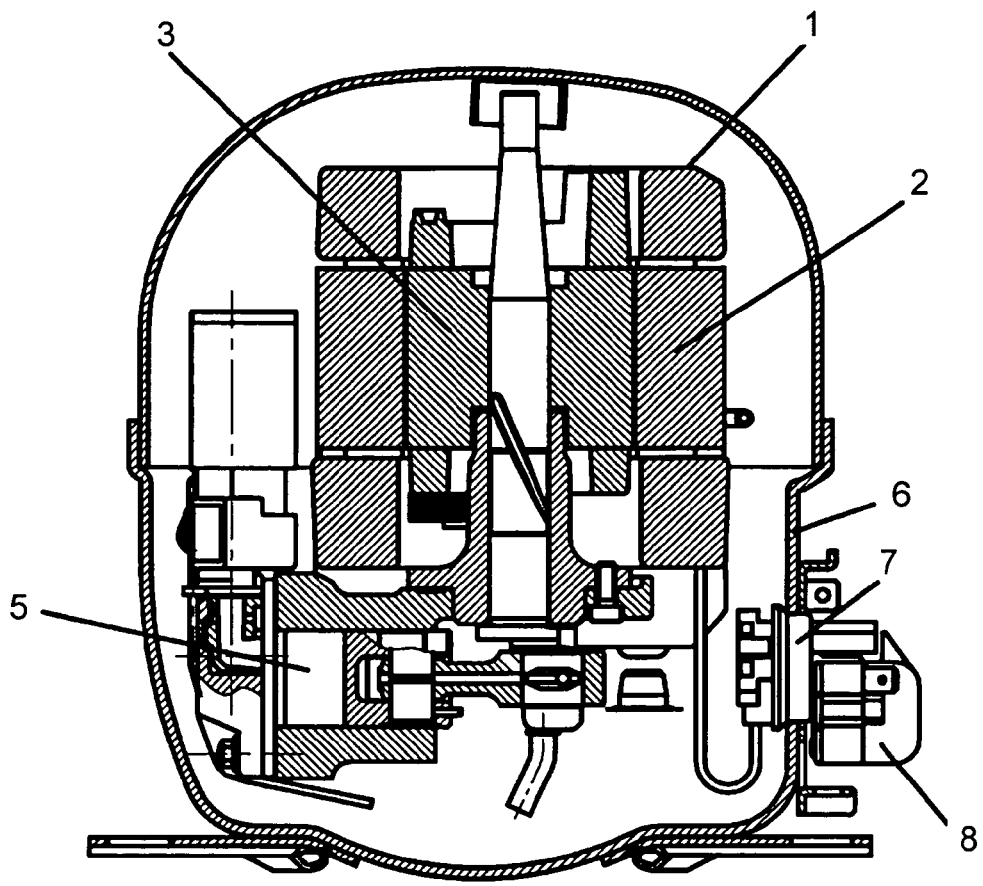
FIG. 12 – PRIOR ART
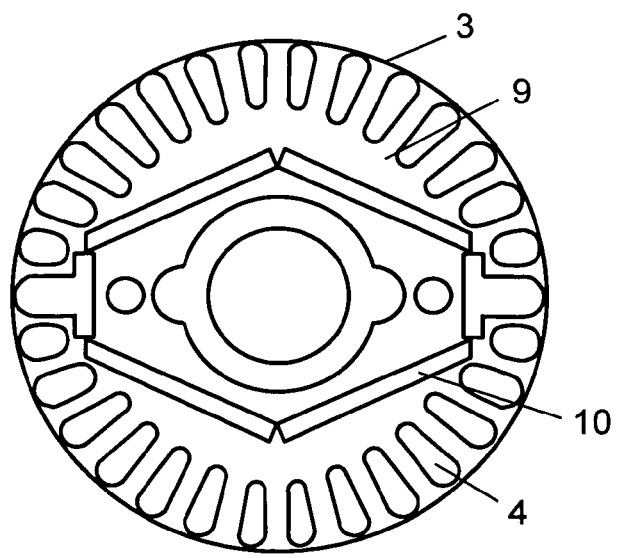

FIG. 13 – PRIOR ART
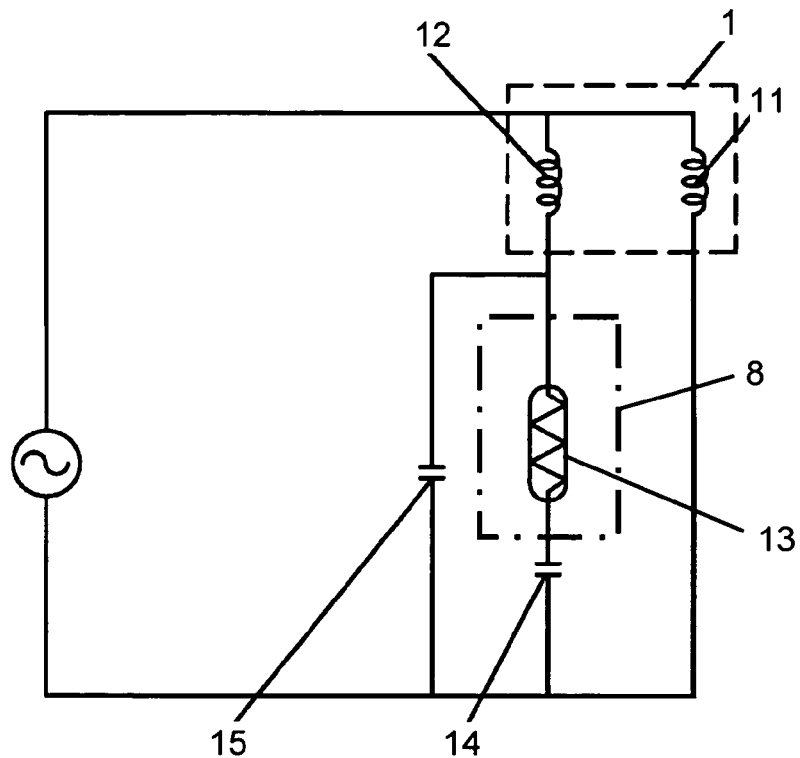
FIG. 14
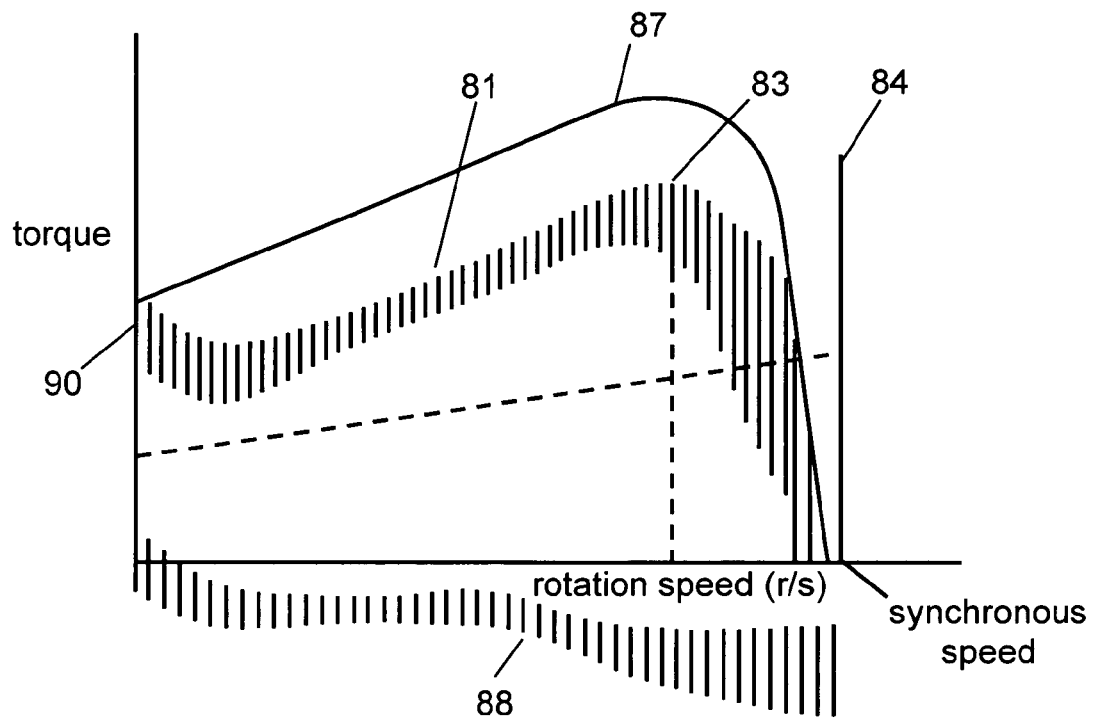

SYNCHRONOUS INDUCTION MOTOR AND ELECTRIC HERMETIC COMPRESSOR USING THE SAME

This application is a U.S. national phase application of PCT international application PCT/JP2004/005541.

TECHNICAL FIELD

The present invention relates to a synchronous induction motor installed in a refrigerator, an air-conditioner or the like, and an electric hermetic compressor using the same.

BACKGROUND ART

In recent years, synchronous induction motors have begun to be used in an electric hermetic compressor mounted in refrigerators, air-conditioners or the like to improve the system efficiency. A starter for the motor includes a PTC relay equipped with a built-in Positive Temperature Coefficient thermistor. Japanese Patent Unexamined Application No. 2002-300763 discloses an example of such a motor and a compressor.

Now, a conventional synchronous induction motor and an electric hermetic compressor using the motor are described with reference to the drawings. FIG. 11 shows a cross sectional view of the conventional electric hermetic compressor. FIG. 12 shows a cross sectional view of a rotor of the conventional synchronous induction motor. FIG. 13 shows a circuit diagram of the conventional synchronous induction motor.

Hermetic housing 6 encloses synchronous induction motor 1 and compression unit 5 driven by motor 1. Motor 1 starts as an induction motor and runs as a synchronous induction motor in sync with the supply voltage frequency at steady state running. Motor 1 has stator 2 and rotor 3. Stator 2 consists of main winding 11 and auxiliary winding 12 wound on a core (not shown) made of electric steel sheet laminations. Rotor 3 encloses permanent magnets 10 disposed in yoke 9 also made of electric steel sheet laminations, and has aluminum-made secondary conductors 4 disposed in a vicinity of the periphery of yoke 9.

Hermetic terminal 7 connects operating capacitor 15 to auxiliary winding 12. Starting capacitor 14 and PTC relay 8 that includes positive temperature coefficient thermistor 13 are connected in parallel with operating capacitor 15 and are connected in series with auxiliary winding 12.

FIG. 14 shows speed vs. torque curves of a synchronous induction motor, where the horizontal axis denotes rotation speed of motor 1 and the vertical axis denotes torque force.

Curve 87 shows an inherent torque characteristic of the induction motor. Resultant torque 81 is result of adding brake torque 88 generated by permanent magnets 10 to the torque characteristic shown by curve 87. Resultant torque 81 represents the output torque of motor 1. Torque 90 represents the starting torque of motor 1 and torque 83 represents the maximum torque of motor 1. Torque 84 represents an output torque at a synchronous speed, and motor 1 usually runs in a synchronous operation with loading under the maximum value of torque 84.

Next, the operation of motor 1 with the aforementioned configuration and an electric hermetic compressor using the same are described.

Upon energizing, starting current flows into main winding 11, auxiliary winding 12, thermistor 13, starting capacitor 14 and operating capacitor 15. When flowing the starting current, main winding 11 and auxiliary winding 12 establish a rotating magnetic field, which induces induction currents on secondary conductors 4, causing rotor 3 to generate its own magnetic field. With starting torque 90 obtained from the magnetic field, rotor 3 starts running and continues to accelerate the speed along with output torque curve 81. After approaching the synchronous speed, then the motor reaches a synchronous operation at the synchronous speed generating torque 84.

At the same time, current flowing into thermistor 13 generates self-heating in thermistor 13, causing thermistor 13 to increase in temperature and subsequently in resistance value rapidly. Consequently, current flowing into starting capacitor 14 is substantially cut off, and motor 1 continues running at the synchronous speed.

Next, rotor 3 drives compression unit 5 to carry out a known compressing operation.

However, a minute electric current continues to flow into thermistor 13 for the heating to keep the resistance in a high value during running of motor 1 with the aforementioned conventional configuration. To provide motor 1 with a required torque property, an amount of torque is needed as described above to compensate the torque offset by the brake torque generated in permanent magnets 10. For this reason, motor 1 needs a larger magnetic inductive torque compared with ordinary induction motors.

Typically, to increase the magnetic inductive torque, the number of windings of auxiliary winding 12 is increased to have a larger winding ratio. As a result, however, a higher voltage is induced in auxiliary winding 12 causing a higher voltage applied on PTC relay 8 connected to auxiliary winding 12 as well. Thermistor 13 is thus required to have a higher voltage resistance than ordinary induction motors to withstand the voltage.

To increase the voltage resistance of thermistor 13, thermistor 13 should have a larger volume. Such a configuration needs to increase the amount of heat emission required to maintain the resistance in a high value, causing PTC relay 8 to increase the power for self-consumption to a higher level of 3 to 4 watts, thereby causing motor 1 to decrease the system efficiency greatly. The system efficiency of the electric hermetic compressor having motor 1 with this configuration consequently decreases.

Additionally, the enlarged diameter of thermistor 13 increases the heat capacity of thermistor 13, causing difficulty in fast cooling. Namely, a longer time is required to cool thermistor 13 to a temperature ready for re-starting, resulting in a poor re-starting property for the electric hermetic compressor.

SUMMARY OF THE INVENTION

A synchronous induction motor has a stator with a main winding and an auxiliary winding, a yoke, a rotor with permanent magnets embedded in the yoke and secondary conductors provided in the vicinity of a periphery of the permanent magnets, and a starter. The starter has a starting capacitor connected in series with the auxiliary winding of the synchronous induction motor, and a switching unit to connect/disconnect the circuit to the auxiliary winding from the starting capacitor. The switching unit connects the circuit to the auxiliary winding from the starting capacitor when the motor is at rest, and disconnects the circuit after starting of the motor.

BRIEF DESCRIPTION OF THE DRAWINGS

FIG. 11 is a cross-sectional view of a conventional electric hermetic compressor.

FIG. 12 is a cross-sectional view of a rotor for the conventional synchronous induction motor.

FIG. 13 is a circuit diagram of the conventional synchronous induction motor.

FIG. 14 is a graph showing speed vs. torque curve of a synchronous induction motor.

DETAILED DESCRIPTION OF PREFERRED EMBODIMENTS

Now, exemplary embodiments of the present invention are described with reference to the drawings. In every exemplary embodiment, the same marks are applied for the same configuration and operation as described in the previous embodiment(s) and the detailed descriptions are omitted.

Exemplary Embodiment 1

Figure 1:
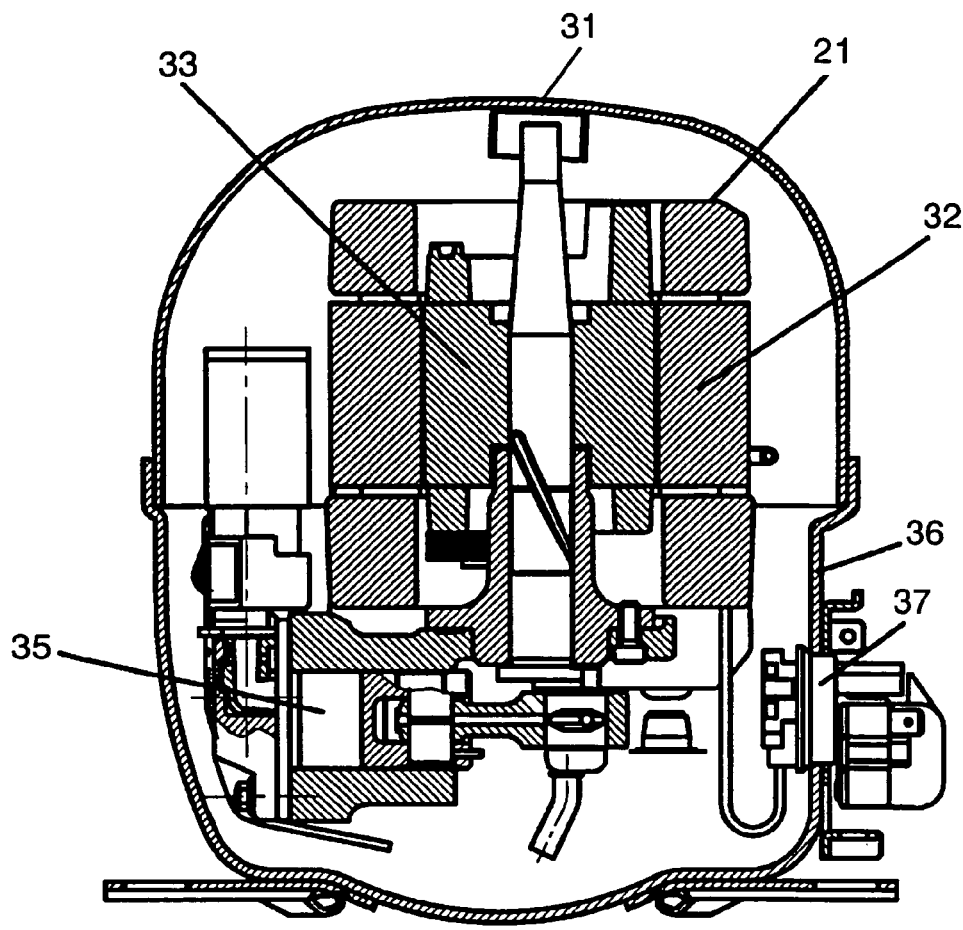
FIG. 1 is a cross-sectional view of an electric hermetic compressor according to an exemplary embodiment of the present invention.
Figure 2:
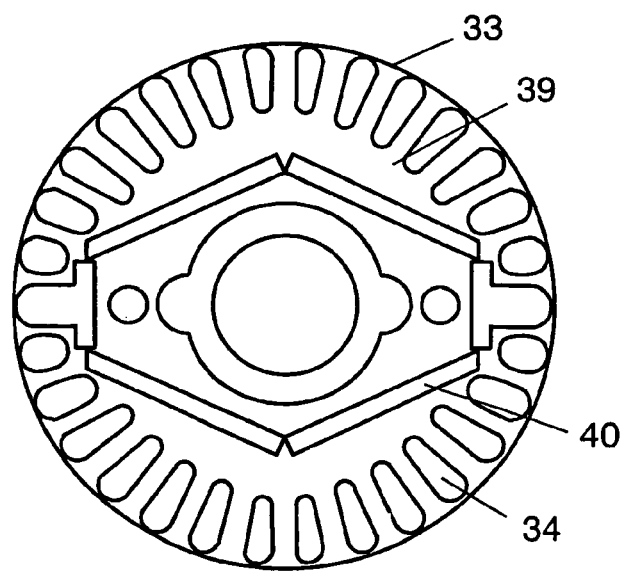
FIG. 2 is a cross-sectional view of a rotor for a synchronous induction motor according to the exemplary embodiment of the present invention.
Figure 3:
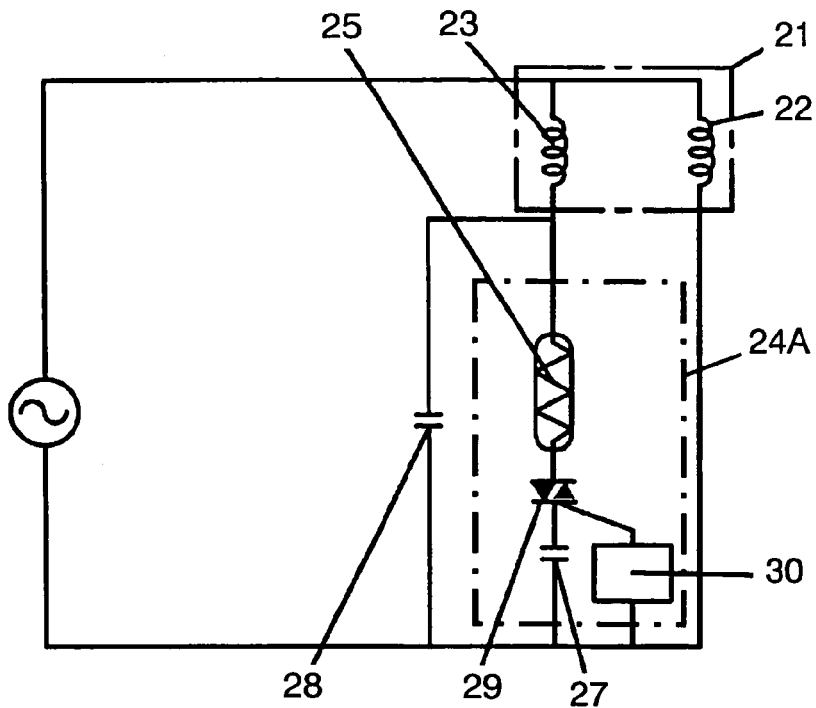
FIG. 3 is a circuit diagram of the synchronous induction motor according to the exemplary embodiment of the present invention.

FIG. 1 is a cross-sectional view of an electric hermetic compressor according to an exemplary embodiment of the present invention, and FIG. 2 is a cross-sectional view of a rotor for the synchronous induction motor. FIG. 3 is a circuit diagram of the synchronous induction motor.

Hermetic housing 36 of electric hermetic compressor 31 contains synchronous induction motor 21 and compression unit 35 driven by motor 21. Motor 21 starts as an induction motor and runs as a synchronous induction motor to rotate in sync with a supply frequency at steady state running (operation). Motor 21 has stator 32 and rotor 33. Stator 32 has main winding 22 and auxiliary winding 23 wound on a core (not shown) made of steel sheet laminations. Rotor 33 encloses permanent magnets 40 in yoke 39 made also of steel sheet laminations and has aluminum-made secondary conductors 34 provided in the vicinity of the periphery of yoke 39.

Auxiliary winding 23 is connected in series with positive temperature coefficient thermistor 25, triac 29 and starting capacitor 27, all included in starter 24A. Operating capacitor 28 is connected in parallel with the series circuit. Triac 29 is connected in series with thermistor 25 and starting capacitor 27, and the gate of triac 29 is connected to trigger circuit 30 that controls triac 29. Known circuits such as circuits composed of resistors, diodes and capacitors, circuits comprising thermistors or the like (not shown) can be used as trigger circuit 30.

Now, the operation of motor 21 with aforementioned configuration is described.

When energizing trigger circuit 30, triac 29 in an off-state at the start turns into an on-state. Starting current flows into auxiliary winding 23 of motor 21 to perform starting operations. Namely, starting current flows into main winding 22, auxiliary winding 23, thermistor 25, starting capacitor 27 and operating capacitor 28. When the starting current flows, main winding 22 and auxiliary winding 23 establish a rotating magnetic field, which induces an induction current on secondary conductors 34 to generate a magnetic field. Rotor 33 thus starts running by a starting torque caused by the magnetic field generated in stator 32, and continues to accelerate the running speed to reach a synchronous operation at a synchronous speed.

On the other hand, the starting current flowing into thermistor 25 built in starter 24 generates self-heating in thermistor 25 to cause a rapid increase in electrical resistance and a decrease in current flow to auxiliary winding 23. The starting operations are thus accomplished and induction motor 21 runs at a synchronous speed.

Moreover, after a certain period of time from the starting, trigger circuit 30 lowers the gate voltage of triac 29 to turn triac 29 into the off-state. At the off-state of triac 29, thermistor 25 does not dissipate any electric power as the current flowing into thermistor 25 is interrupted. As mentioned above triac 29 and trigger circuit 30 form a switching unit acting to connect motor 21 to starting capacitor 27 at start and to disconnect motor 21 from starting capacitor 27 after starting. Namely starter 24A has thermistor 25, starting capacitor 27 and the switching unit.

Consequently, motor 21 and compressor 31 with a high efficiency are provided as several watts of power consumed wastefully in thermistor 25 is not dissipated any more. Additionally, thermistor 25 is cooled by heat radiation while compressor 31 is running as the current flow to thermistor 25 is interrupted, and thermistor 25 can return back to a low resistance state. As a result, the starter unit with the configuration can provide motor 21 and compressor 31 with excellent an re-starting property as motor 21 is in a condition approximately full-time ready for starting. Additionally, the switching unit performs with a high reliability as triac 29 functions as a non-contact switch.

A switching unit without using a thermistor 25 in the switching unit shown in FIG. 3 may also be possible to work with the switching function of triac 29 only. In this case, however, trigger circuit 30 is required to disconnect the circuit at the right time after starting. On the contrary, the switching unit provided with thermistor 25 as shown in FIG. 3 disconnects the circuit practically just after the starting of motor 21 by the effect of an increase in resistance, and then triac 29 may work the switching function. Namely, trigger circuit 30 is not required to control with so high an accuracy.

Exemplary Embodiment 2

Figure 4:
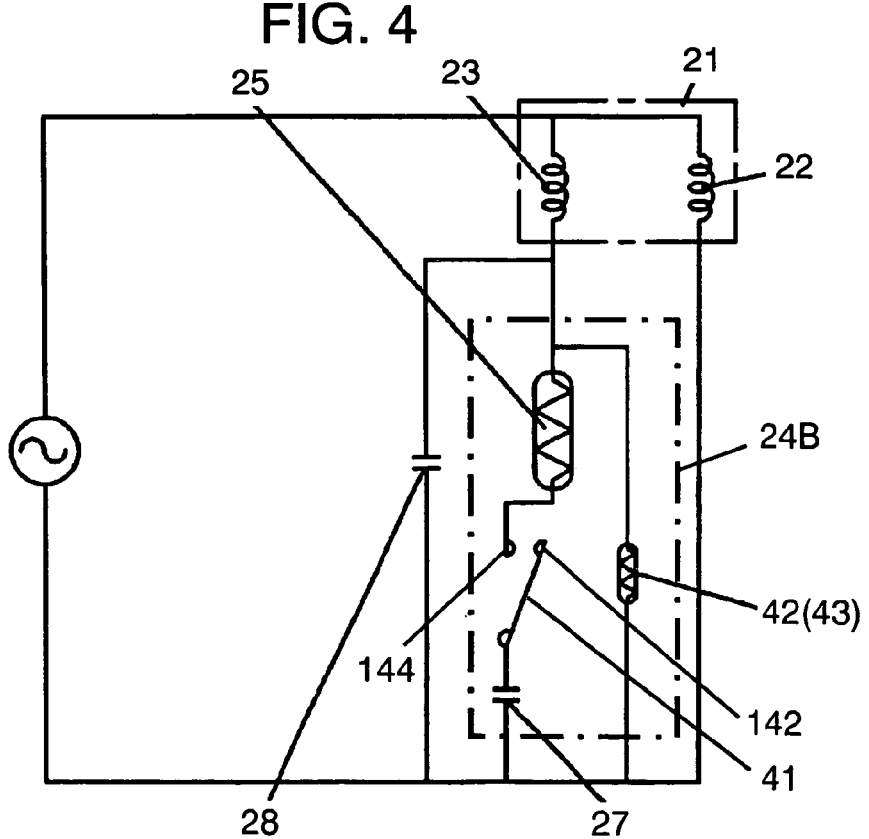
FIG. 4 is a circuit diagram of another synchronous induction motor according to the exemplary embodiment of the present invention.

FIG. 4 shows a circuit diagram of a synchronous induction motor used in a second exemplary embodiment of the present invention. As shown in FIG. 4, starter 24B includes thermistor 25, starting capacitor 27, bimetal switch 41, and auxiliary positive temperature coefficient thermistor (auxiliary thermistor) 42. Bimetal switch 41 is connected in series with thermistor 25 and starting capacitor 27. Auxiliary thermistor 42, connected electrically to auxiliary winding 23 and in parallel with bimetal switch 41 to act as a heating element, is coupled thermally with bimetal switch 41 to apply thermal effects on bimetal switch 41. A switching unit has bimetal switch 41 and auxiliary thermistor 42 in this configuration. Namely, starter 24B has thermistor 25, starting capacitor 27 and the switching unit. Components other than used in the configuration are the same as those used in the first exemplary embodiment.

Next, the operations of synchronous induction motor 21 and starter 24B with the aforementioned configuration are described.

At the start, movable contact 142 is attached to fixed contact 144 making bimetal switch 41 on-state to perform the starting operations for motor 21 by flowing starting current into auxiliary winding 23. The starting current flowing into thermistor 25 built in starter 24B develops self-heating in thermistor 25 to cause a rapid increase in electrical resistance and a decrease in current flow to auxiliary winding 23. The starting operations are thus accomplished and induction motor 21 runs at a synchronous speed.

Moreover, after a certain period of time from the starting, auxiliary thermistor 42 develops self-heating to heat up bimetal switch 41. When reaching an operating temperature of bimetal switch 41, movable contact 142 of bimetal switch 41 deflects off from fixed contact 144, leaving bimetal switch 41 in an off-state. At the off-state of bimetal switch 41, thermistor 25 does not dissipate any electric power as the current flow to thermistor 25 is interrupted. Similar to the first exemplary embodiment, therefore, the configuration can provide motor 21 and compressor 31 with a high efficiency and excellent re-starting property.

Additionally, the power lost in self-heating of auxiliary thermistor 42 is only a little as the wattage consumption needed for the heating can be set to a very low value.

Figure 5:
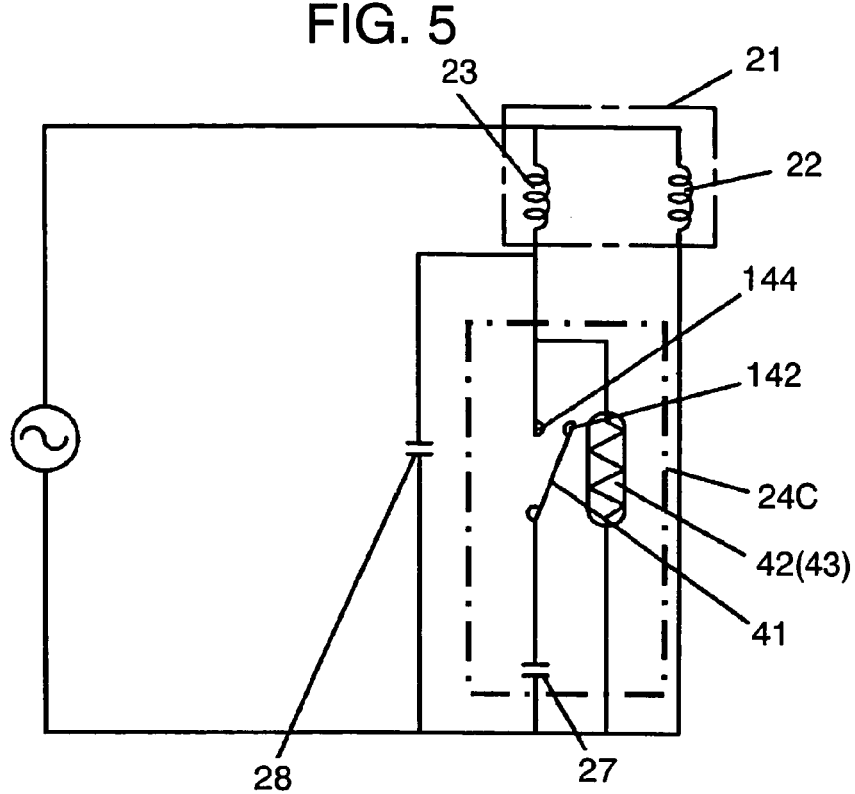
FIG. 5 is a circuit diagram of a further different synchronous induction motor according to the exemplary embodiment of the present invention.

In the aforementioned configuration, a starter without using thermistor 25 such as starter 24C as shown in FIG. 5 can be possible. In this case, bimetal switch 41 and auxiliary thermistor 42 compose a switching unit. Namely, starting capacitor 27 and the switching unit compose starter 24C.

Next, operations of motor 21 and starter 24C with this configuration are described. When bimetal switch 41 is in an on-state at the start, starting current flows into auxiliary winding 23 and main winding 22 to produce a rotating magnetic field. Accelerating a rotating speed along with speed vs. torque curve, motor 21 reaches a synchronous operation at a synchronous speed and thus accomplishes the starting operations.

During a time from the starting to the synchronous operation, auxiliary thermistor 42 emits heat energy to heat up bimetal switch 41. When reaching an operating temperature, bimetal switch 41 deflects off from the circuit leaving bimetal switch 41 in an off-state. At the off-state of bimetal switch 41, starting capacitor 27 is disconnected from auxiliary winding 23.

Power consumed in the switching action of bimetal switch 41 is practically the power consumed in causing auxiliary thermistor 42 to heat up bimetal switch 41 only. The power consumption, being not more than 1 W, is smaller than power consumed in a thermistor of a built-in PTC relay. Therefore, starter 24C can start motor 21 and can keep the deflected position of bimetal switch 41 contacts using lower wattage consumption than a PTC relay.

As mentioned above, the configuration can start and operate motor 21 and compressor 31 with only a low power consumption of auxiliary thermistor 42. Namely, the configuration can save the power of the order of several watts consumed in a motor when running with a PTC relay, contributing to high system efficiency.

Moreover, auxiliary thermistor 42, as having a higher resistance than a PTC relay, has a small volume easy to radiate heat, causing it to cool to a temperature ready for quick re-starting of motor 21. The configuration, therefore, can provide motor 21 and compressor 31 with a good re-starting property.

However, when bimetal switch 41 is operated by heat emission from auxiliary thermistor 42, bimetal switch 41 is apt to work under fluctuating accuracy. To cope with the problem, thermistor 25 is used together with bimetal switch 41 as shown in FIG. 4 to increase the resistance value of thermistor 25, causing the circuit to disconnect just after starting of motor 21.

Additionally, in the configurations shown in FIGS. 4 and 5 of this exemplary embodiment, a heater 43 instead of the auxiliary thermistor 42 can be used as a heating element, resulting in similar effects. In this case, the power lost in the heating operation is comparatively low, as heater 43 can be set to consume a very low level power. Another advantageous point is that heater 43 is cheaper than auxiliary thermistor 42.

Exemplary Embodiment 3

Figure 6:
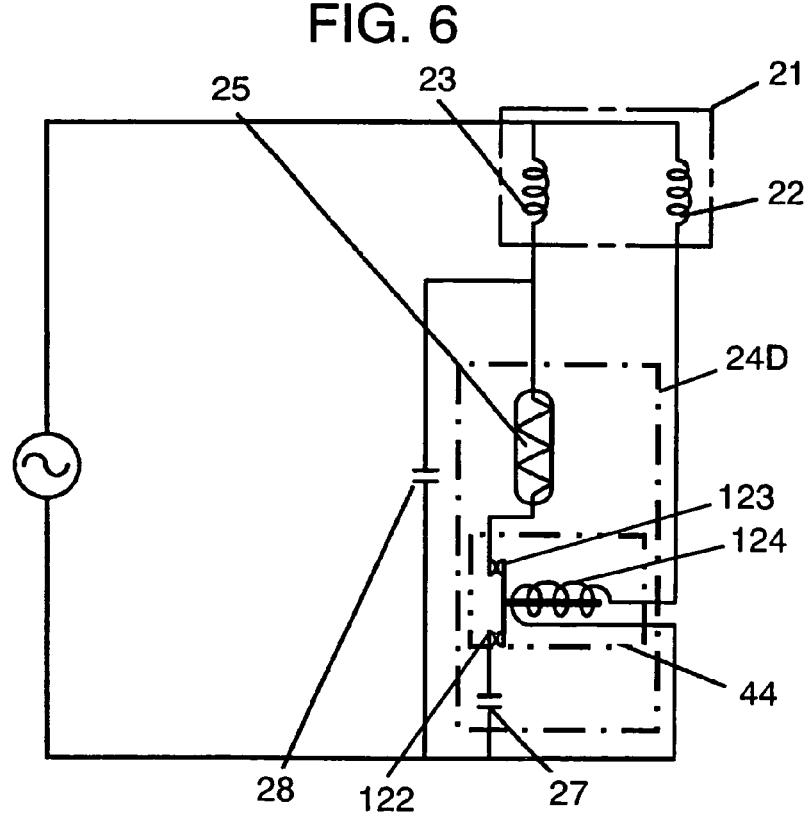
FIG. 6 is a circuit diagram of a still further different synchronous induction motor according to the exemplary embodiment of the present invention.

FIG. 6 shows a circuit diagram of a synchronous induction motor according to a third exemplary embodiment of the present invention. In FIG. 6, starter 24D includes thermistor 25, starting capacitor 27 and current relay 44. Fixed contact 122 and movable contact 123 of relay 44 are connected in series with thermistor 25 and starting capacitor 27. Coil 124 of relay 44 is connected in series with main winding 22. Relay 44 acts as a switching unit in this exemplary embodiment. Starter 24D includes thermistor 25, starting capacitor 27 and the switching unit. Components other than those described in this configuration are the same as those used in the first exemplary embodiment.

Figure 7:
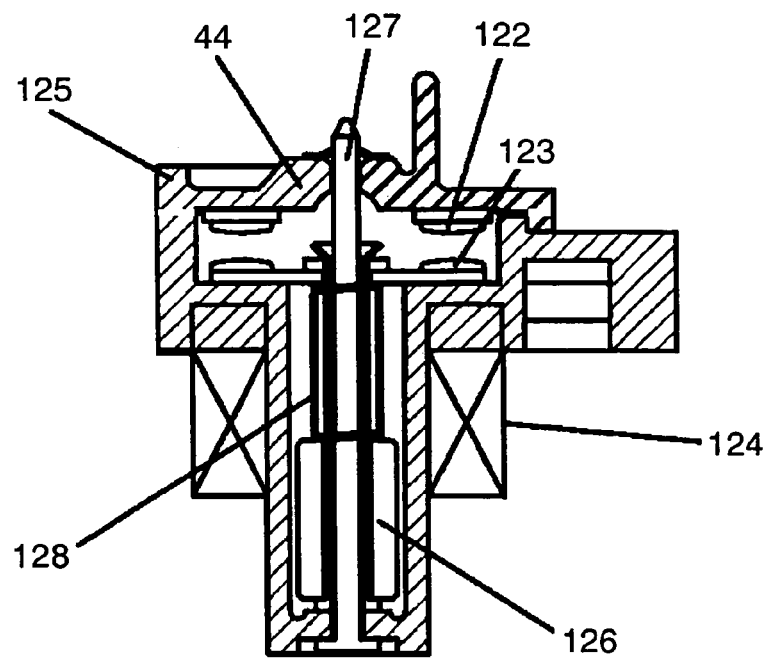
FIG. 7 is a cross-sectional view of the starter in FIG. 6.

FIG. 7 shows a cross-sectional view of relay 44. Relay 44 encloses fixed contact 122 and movable contact 123 in casing 125. Movable contact 123 is incorporated with plunger 126. Relay 44 further includes central pin 127 for guiding plunger 126 and spring 128 for aiding movements of movable contact 123. Coil 124 is wound outside of casing 125 such that coil 124 surrounds plunger 126 externally.

Now, the operations of synchronous induction motor 21 and starter 24D including relay 44 with the aforementioned configuration are described. A starting current flowing into main winding 22 at the start produces a magnetic field around coil 124. The magnetic field attracts plunger 126 incorporated with movable contact 123 toward coil 124 against gravity, while being guided by central pin 127. Subsequently, movable contact 123 contacts fixed contact 122 to put relay 44 in an on-state, and to allow the starting current to flow into auxiliary winding 23. Then, spring 128 shrinks to store a repulsive force.

When the starting current flows into auxiliary winding 23, motor 21 performs starting operations. The starting current flowing into thermistor 25 built in starter 24D produces self-heating, causing thermistor 25 to increase in electrical resistance rapidly and subsequently to decrease in current flow to auxiliary winding 23. The starting operations are thus accomplished and induction motor 21 runs at a synchronous speed.

When the starting operations are accomplished, the magnetic force dependent on the strength of the magnetic field of coil 124 decreases as the current flowing into main winding 22 also decreases rapidly. Then, plunger 126 incorporated with the movable contact 123 moves down by gravity due to its own weight and the repulsive force of spring 128, causing movable contact 123 to disconnect from fixed contact 122. Namely, the contacts of relay 44 are separated to interrupt current flowing into thermistor 25 and to stop power consumption in thermistor 25. Therefore, several watts of power consumed wastefully in thermistor 25 are no longer dissipated. Consequently, the configuration can provide motor 21 and compressor 31 with high system efficiency and an excellent re-starting property the same as those in the first exemplary embodiment. Moreover, starter 24D is disconnected approximately in real time at the start of motor 21 to perform higher system efficiency.

Figure 8:
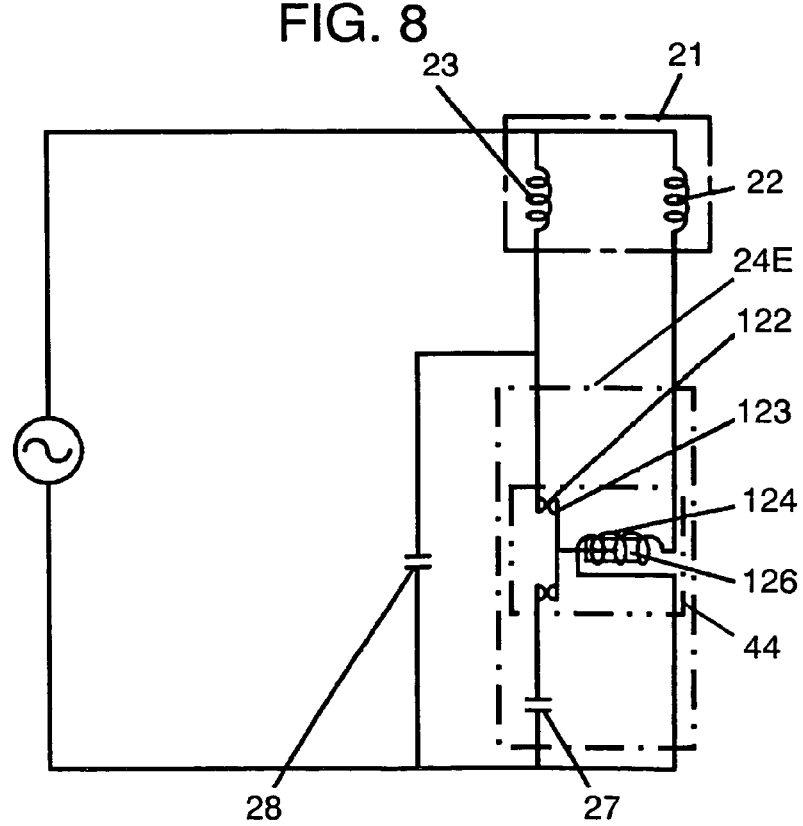
FIG. 8 is a circuit diagram of a still further different synchronous induction motor according to the exemplary embodiment of the present invention.

Starter 24E without using thermistor 25 in the configuration as shown in FIG. 8 may also be possible. Relay 44 acts as the switching unit also in this configuration. Starting capacitor 27 and the switching unit compose starter 24E. Now, the operations of motor 21 and starter 24E with this configuration are described.

As mentioned above, when turning relay 44 to the on-state at the start, a starting current flows into main winding 22 and auxiliary winding 23 to establish a rotating magnetic field. Subsequently, motor 21 starts running to accelerate the running speed along with a speed vs. torque curve. The starting operations are thus accomplished and induction motor 21 reaches a synchronous operation at a synchronous speed. Motor 21 can accomplish the starting operations reliably as relay 44 separates the contacts to disconnect starting capacitor 27 after motor 21 reaches the synchronous speed.

When accomplishing the starting operations of motor 21, current flow into main winding 22 decreases rapidly, separating movable contact 123 from fixed contact 122 as mentioned above, thereby causing starting capacitor 27 to disconnect from auxiliary winding 23. Starter 24E consumes little power while running, as power is consumed in the coil resistance only in the switching operation of movable contact 123.

By the introduction of relay 44, therefore, motor 21 and compressor 31 can perform with high system efficiency, as power consumption of the order of several watts lost in the PTC relay while running can be saved.

As described above, the configuration can provide motor 21 and compressor 31 with high system efficiency and an improved re-starting property as the starting operations are performed without using a PTC relay, causing the PTC relay not to consume any power. Additionally, the simplified structure enables the starter to be downsized.

In the exemplary embodiment, starting capacitor 27 is disconnected from the circuit using relay 44 only, causing fixed contact 122 and movable contact 123 of relay 44 to flow a large current at the start. On the contrary, current flowing into contacts 122 and 123 is reduced by the resistance value of 5 to 40 Ω inherent in thermistor 25 if thermistor 25 is adopted in the configuration. Therefore, contacts 122 and 123 can be prevented from degradation or fusion to improve the life performance.

Exemplary Embodiment 4

Figure 9:
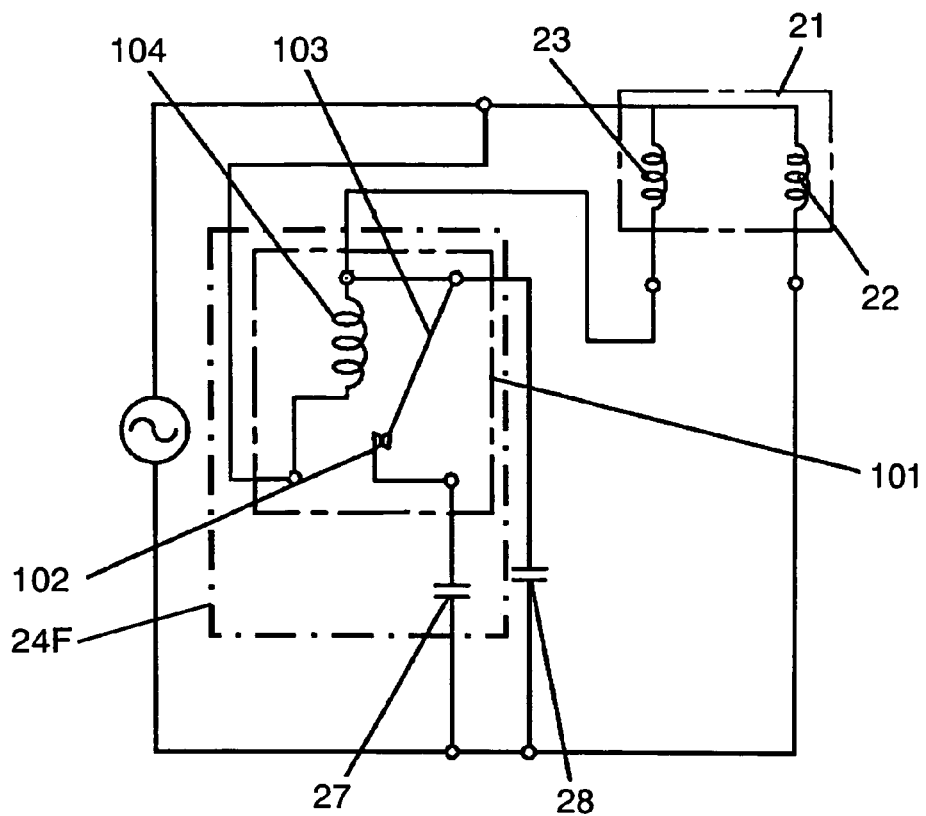
FIG. 9 is a circuit diagram of a still further different synchronous induction motor according to the exemplary embodiment of the present invention.
Figure 10:
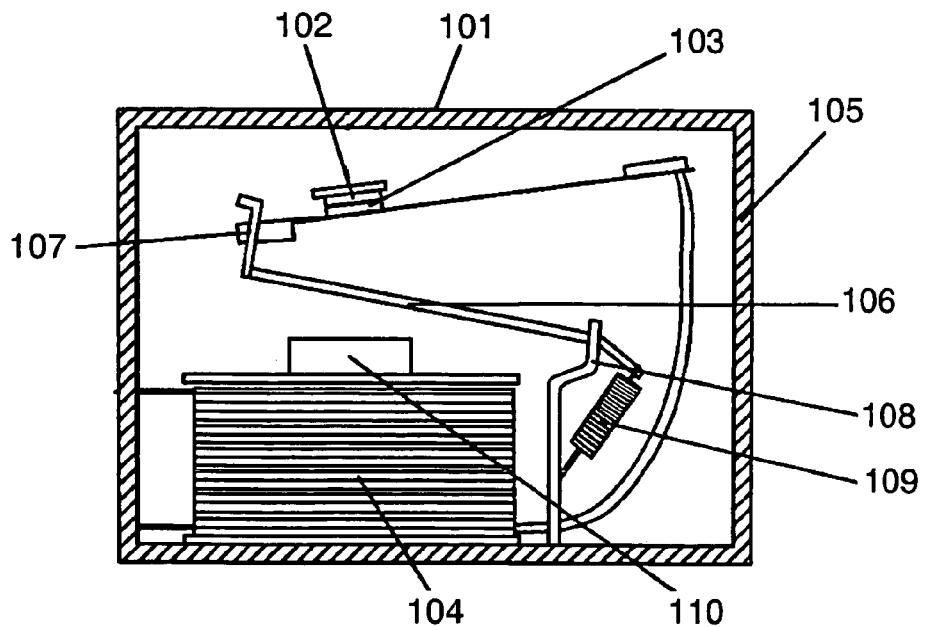
FIG. 10 is a cross-sectional view of a starter in FIG. 9.

FIG. 9 shows a circuit diagram of a synchronous induction motor with a voltage relay according to a fourth exemplary embodiment of the present invention. FIG. 10 shows a cross-sectional view of the voltage relay according to this exemplary embodiment.

In the exemplary embodiment, starter 24F includes starting capacitor 27 and voltage relay 101. Synchronous induction motor 21 has main winding 22 and auxiliary winding 23. Auxiliary winding 23 is connected in series with fixed contact 102 and movable contact 103 of relay 101 and starting capacitor 27. The series circuit is connected in parallel with operating capacitor 28, and coil 104 of relay 101 is connected in parallel with auxiliary winding 23. Relay 101 acts as a switching unit in this configuration. Starter 24F includes starting capacitor 27 and the switching unit.

In casing 105 of relay 101, fixed contact 102 and movable contact 103 are disposed, and fixed contact 102 is connected in series with starting capacitor 27. An end of movable contact 103 is fitted movably through opening 107 provided at one end of mover 106, and the other end of mover 106 is supported by fixed pedestal 108 and is retained by spring 109. Coil 104 wound on core 110 is disposed near mover 106. Mover 106 is composed of magnetic metallic substances such as iron, nickel or the like.

Now, the operations of motor 21 and starter 24F having relay 101 with the aforementioned configuration are described.

When motor 21 is at rest, mover 106 is attracted upward by spring 109, causing movable contact 103 to attach fixed contact 102 to close the circuit. At start, a starting current flows into main winding 22 and auxiliary winding 23 simultaneously. The starting current flowing into auxiliary winding 23 and main winding 22 produces a rotating magnetic field, causing motor 21 to accelerate the rotating speed along with speed vs. torque curve to approach a synchronous operation at a synchronous speed, and the starting operations are thus accomplished.

Although the starting current also flows into coil 104 connected in parallel with auxiliary winding 23 at start to generate a magnetic force around core 110, the magnetic force generated by voltage at the initial state is not strong enough for core 110 to attract mover 106. Accelerating the running speed, however, when motor 21 reaches a synchronous speed, the magnetic force of core 110 is increased to a level to attract mover 106, overcoming the force of spring 109. Then, opening 107 of mover 106 functions to push down movable contact 103, causing movable contact 103 to separate from fixed contact 102 to open the circuit, thereby causing starting capacitor 27 to disconnect from the circuit to accomplish the starting operations. As mentioned above, the configuration can perform reliable starting operations for motor 21, as relay 101 separates the contacts to disconnect starting capacitor 27 after motor 21 reaches a synchronous speed.

When motor 21 is running, mover 106 is attracted to core 110 as coil 104 is energized, keeping movable contact 103 in an off-state. When motor 21 is at rest, on the contrary, no magnetic force is generated in core 110 as coil 104 is not energized. Namely, the contacts are returned back to close the circuit again by the force of spring 109. Starter 24F consumes little power when running, as power is consumed in the resistance of coil 104 only in the switching operation of movable contact 103.

By the introduction of relay 101, therefore, motor 21 and compressor 31 can perform with high system efficiency, as power consumption of the order of several watts lost in the PTC relay at running can be saved.

As described above, the configuration can provide motor 21 and compressor 31 with high system efficiency and an improved re-starting property as the starting operations are performed without using a PTC relay, causing the PTC relay not to consume any power.

INDUSTRIAL APPLICABILITY

The synchronous induction motor disclosed in the present invention has a stator having a main winding and an auxiliary winding, a rotor rotated by a magnetic field produced by the stator, and a starter. The starter has a starting capacitor connected in series with the auxiliary winding of the synchronous induction motor, and a switching unit to open/close a circuit from the starting capacitor to the auxiliary winding. The switching unit closes the circuit from the starting capacitor to the auxiliary winding during the synchronous induction motor at rest, and opens the circuit after starting of the synchronous induction motor. The configuration can provide a synchronous induction motor with high efficiency and improved re-starting property as electric power is not consumed in the positive temperature coefficient thermistor included in a PTC relay, and consequently the positive temperature coefficient thermistor is cooled quickly. Therefore, the synchronous induction motor with this configuration can provide highly efficient and easy to re-start electric hermetic compressor.

The invention claimed is:

1. A synchronous induction motor comprising:
a stator having a main winding and an auxiliary winding;
a rotor having a yoke, a permanent magnet embedded in the yoke and a secondary conductor provided in a vicinity of a periphery of the yoke, and
a starter including:
    a starting capacitor connected in series with the auxiliary winding;
    a positive temperature coefficient thermistor connected in series with the auxiliary winding and the starting capacitor; and
    a switching unit operable to close a circuit to the auxiliary winding from the starting capacitor when the synchronous induction motor is at rest, and operable to open the circuit and thereby cut off current flowing to the positive temperature thermistor after the synchronous induction motor is started.

2. The synchronous induction motor according to claim 1, wherein the switching unit has a triac connected in series with the circuit and a trigger circuit to control the triac.

3. The synchronous induction motor according to claim 1, wherein the switching unit has a bimetal switch connected in series with the circuit and a heating element connected in parallel with the bimetal switch to thermally affect the bimetal switch.

4. The synchronous induction motor according to claim 3, wherein the heating element has one of a positive temperature coefficient thermistor and a heater.

5. The synchronous induction motor according to claim 1, wherein the switching unit is a current relay having a coil connected in series with the main winding, a movable contact driven by the coil, and a fixed contact connected in series with the circuit to attach the fixed contact.

6. The synchronous induction motor according to claim 5, wherein the current relay further has a plunger incorporated with the movable contact, and the coil is operable to move the plunger in the direction against gravity to close the circuit when the motor is started, and the plunger is operable to be moved by gravity so as to open the circuit after the motor is started.

7. The synchronous induction motor according to claim 1, wherein the switching unit is a voltage relay having a coil connected in parallel with the auxiliary winding, a movable contact driven by the coil, and a fixed contact connected in series with the circuit to attach the fixed contact.

8. An electric hermetic compressor comprising:
a hermetic housing;
a synchronous induction motor in the hermetic housing, the synchronous induction motor including:
    a stator having a main winding and an auxiliary winding;
    a rotor having a yoke, a permanent magnet embedded in the yoke and a secondary conductor provided in a vicinity of a periphery of the yoke, and
    a starter including:
        a starting capacitor connected in series with the auxiliary winding;
        a positive temperature coefficient thermistor connected in series with the auxiliary winding and the starting capacitor; and
        a switching unit operable to close a circuit to the auxiliary winding from the starting capacitor when the synchronous induction motor is at rest, and operable to open the circuit and thereby cut off current flowing to the positive temperature thermistor after the synchronous induction motor is started; and
a compression unit to be driven by the synchronous induction motor.

9. The electric hermetic compressor according to claim 8, wherein the switching unit has a triac connected in series with the circuit and a trigger circuit to control the triac.

10. The electric hermetic compressor according to claim 8, wherein the switching unit has a bimetal switch connected in series with the circuit and a heating element connected in parallel with the bimetal switch to thermally affect the bimetal switch.

11. The electric hermetic compressor according to claim 10, wherein the heating element has one of a positive temperature coefficient thermistor and a heater.

12. The electric hermetic compressor according to claim 8, wherein the switching unit is a current relay having a coil connected in series with the main winding, a movable contact driven by the coil, and a fixed contact connected in series with the circuit to attach the fixed contact.

13. The electric hermetic compressor according to claim 12, wherein the current relay further has a plunger incorporated with the movable contact, and the coil is operable to move the plunger in the direction against gravity to close the circuit when the motor is started, and the plunger is operable to be moved by gravity so as to open the circuit after the motor is started.

14. The electric hermetic compressor according to claim 8, wherein the switching unit is a voltage relay having a coil connected in parallel with the auxiliary winding, a movable contact driven by the coil, and a fixed contact connected in series with the circuit to attach the fixed contact.

15. A synchronous induction motor comprising:
a stator having a main winding and an auxiliary winding;
a rotor having a yoke, a permanent magnet embedded in the yoke and a secondary conductor provided in a vicinity of a periphery of the yoke; and a starter including:
  a starting capacitor connected in series with the auxiliary winding; and
  a switching unit operable to close a circuit to the auxiliary winding from the starting capacitor when the synchronous induction motor is at rest, and to open the circuit after the synchronous induction motor is started, said switching unit including:
    a triac connected in series with the circuit; and
    a trigger circuit operable to control said triac.

16. The synchronous induction motor according to claim 15, wherein said switching unit is arranged in parallel with the main winding so as not to consume electricity after opening the circuit to the auxiliary winding during steady operation of the synchronous induction motor.

17. An electric hermetic compressor comprising:
a hermetic housing:
a synchronous induction motor in the hermetic housing, the synchronous induction motor including:
  a stator having a main winding and an auxiliary winding;
  a rotor having a yoke, a permanent magnet embedded in the yoke and a secondary conductor provided in a vicinity of a periphery of the yoke; and
  a starter including:
    a starting capacitor connected in series with the auxiliary winding; and
    a switching unit operable to close a circuit to the auxiliary winding from the starting capacitor when the synchronous induction motor is at rest, and to open the circuit after the synchronous induction motor is started, said switching unit including:
      a triac connected in series with the circuit; and
      a trigger circuit operable to control the triac; and
a compression unit driven by the synchronous induction motor.

18. The electric hermetic compressor according to claim 17, wherein the switching unit is arranged in parallel with the main winding so as not to consume electricity after opening the circuit to the auxiliary winding during steady operation of the synchronous induction motor.

19. A synchronous induction motor comprising:
a stator having a main winding and an auxiliary winding;
a rotor having a yoke, a permanent magnet embedded in the yoke and a secondary conductor provided in a vicinity of a periphery of the yoke; and
a starter including:
  a starting capacitor connected in series with the auxiliary winding; and
  a switching unit operable to close a circuit to the auxiliary winding from the starting capacitor when the synchronous induction motor is at rest, and to open the circuit after the synchronous induction motor is started, said switching unit including:
    a bimetal switch connected in series with the circuit; and
    a heating element connected in parallel with the bimetal switch so as to thermally affect the bimetal switch.

20. The synchronous induction motor according to claim 19, wherein the heating element has one of a positive temperature coefficient thermistor and a heater.

21. An electric hermetic compressor comprising:
a hermetic housing;
a sychronous induction motor in the hermetic housing, the sychronous induction motor including:
  a stator having a main winding and an auxiliary winding;
  a rotor having a yoke, a permanent magnet embedded in the yoke and a secondary conductor provided in a vicinity of a periphery of the yoke; and
  a starter including:
    a starting capacitor connected in series with the auxiliary winding; and
    a switching unit operable to close a circuit to the auxiliary winding from the starting capacitor when the synchronous induction motor is at rest, and to open the circuit after the synchronous induction motor is started, said switching unit including:
      a bimetal switch connected in series with the circuit; and
      a heating element connected in parallel with the bimetal switch so as to thermally affect the bimetal switch; and
a compression unit to be driven by the sychronous induction motor.

22. The electric hermetic compressor according to claim 21, wherein the heating element has one of a positive temperature coefficient thermistor and a heater.

23. A synchronous induction motor comprising:
a stator having a main winding and an auxiliary winding;
a rotor having a yoke, a permanent magnet embedded in the yoke and a secondary conductor provided in a vicinity of a periphery of the yoke; and
a starter including:
  a starting capacitor connected in series with the auxiliary winding; and
  a current relay operable to close a circuit to the auxiliary winding from the starting capacitor when the synchronous induction motor is at rest, and to open the circuit after the synchronous induction motor is started, the current relay including:
    a coil connected in series with the main winding;
    a movable contact driven by the coil; and
    a fixed contact connected in series with the circuit to attach the fixed contact.

24. The synchronous induction motor according to claim 23, wherein the current relay further includes a plunger incorporated with the movable contact, and the coil is operable to move the plunger in the direction against gravity to close the circuit when the motor is started, and the plunger is operable to be moved by gravity so as to open the circuit after the motor is started.

25. An electric hermetic compressor comprising:
a hermetic housing;
a synchronous induction motor in the hermetic housing, the synchronous induction motor including:
  a stator having a main winding and an auxiliary winding;
  a rotor having a yoke, a permanent magnet embedded in the yoke and a secondary conductor provided in a vicinity of a periphery of the yoke; and
  a starter including:
    a starting capacitor connected in series with the auxiliary winding; and
    a current relay operable to close a circuit to the auxiliary winding from the starting capacitor when the synchronous induction motor is at rest, and to open the circuit after the synchronous induction motor is started, the current relay including:

a coil connected in series with the main winding;
a movable contact driven by the coil; and
a fixed contact connected in series with the circuit to attach the fixed contact; and
a compression unit to be driven by the synchronous induction motor.

26. The electric hermetic compressor according to claim 23, wherein the current relay further includes a plunger incorporated with the movable contact, and the coil is operable to move the plunger in the direction against gravity to close the circuit when the motor is started, and the plunger is operable to be moved by gravity so as to open the circuit after the motor is started.

* * * * *

UNITED STATES PATENT AND TRADEMARK OFFICE
CERTIFICATE OF CORRECTION

PATENT NO. : 7,071,650 B2  
APPLICATION NO. : 10/519938  
DATED : July 4, 2006  
INVENTOR(S) : Keizo Iida Page 1 of 1

It is certified that error appears in the above-identified patent and that said Letters Patent is hereby corrected as shown below:

ON THE TITLE PAGE

In section (12), please replace "Ilda" with --Iida--.

In section (75), please replace "Ilda" with --Iida--.

In section (87), line 2, please replace "Jan. 20, 2003" with --Jan. 20, 2005--.

Signed and Sealed this

Thirtieth Day of January, 2007

JON W. DUDAS  
*Director of the United States Patent and Trademark Office*